(12) United States Patent
Burkhardt et al.

(10) Patent No.: US 10,240,566 B2
(45) Date of Patent: Mar. 26, 2019

(54) THROTTLE DEVICE FOR CONTROLLING AN AMOUNT OF FUEL TO BE SUPPLIED TO A FUEL INJECTION NOZZLE, AS WELL AS AN INJECTION DEVICE

(71) Applicant: CONTINENTAL AUTOMOTIVE GMBH, Hannover (DE)

(72) Inventors: Axel Burkhardt, Muehlhacker (DE); Sandeep Kumar Mouvanal, Kannur (IN)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/502,649

(22) PCT Filed: Aug. 6, 2015

(86) PCT No.: PCT/EP2015/068129
§ 371 (c)(1),
(2) Date: Feb. 8, 2017

(87) PCT Pub. No.: WO2016/020469
PCT Pub. Date: Feb. 11, 2016

(65) Prior Publication Data
US 2017/0226974 A1    Aug. 10, 2017

(30) Foreign Application Priority Data

Aug. 8, 2014    (DE) .................. 10 2014 215 749

(51) Int. Cl.
| | | |
|---|---|---|
| F02B 3/00 | (2006.01) | |
| F02M 47/02 | (2006.01) | |
| F02M 63/00 | (2006.01) | |

(52) U.S. Cl.
CPC ...... F02M 47/027 (2013.01); F02M 63/0026 (2013.01); *F02M 2200/28* (2013.01)

(58) Field of Classification Search
CPC combination set(s) only.
See application file for complete search history.

(56) References Cited

U.S. PATENT DOCUMENTS

| 6,145,492 A | 11/2000 | Lixl |
|---|---|---|
| 6,371,084 B1 | 4/2002 | Betz |
| (Continued) | | |

FOREIGN PATENT DOCUMENTS

| CN | 102828857 A | 12/2012 |
|---|---|---|
| DE | 19827267 A1 | 12/1999 |
| (Continued) | | |

OTHER PUBLICATIONS

Machine Translation of DE 19859592 C1 PDF File Name: "DE19859592C1_Machine_Translation.pdf".*

(Continued)

*Primary Examiner* — Stephen K Cronin
*Assistant Examiner* — Ruben Picon-Feliciano
(74) *Attorney, Agent, or Firm* — Laurence A. Greenberg; Werner H. Stemer; Ralph E. Locher

(57) ABSTRACT

A throttle device for controlling a fuel quantity to be supplied to a fuel injection nozzle includes a control chamber and a supply device for supplying fuel to the control chamber. The supply device includes an inlet throttle having a length selected such that a fuel flowing through the inlet throttle, when in operation, flows through the inlet throttle in a turbulent flow. An injection device including the throttle device is also provided.

14 Claims, 3 Drawing Sheets

(56) References Cited

U.S. PATENT DOCUMENTS

| | | |
|---|---|---|
| 6,382,185 B1 | 5/2002 | Mennicken et al. |
| 6,789,753 B2 | 9/2004 | Aoki et al. |
| 2010/0175665 A1 | 7/2010 | Burger et al. |
| 2010/0252651 A1 | 10/2010 | Kagami et al. |

FOREIGN PATENT DOCUMENTS

| | | | |
|---|---|---|---|
| DE | 19859592 C1 * | 5/2000 | ............ F02M 47/02 |
| DE | 10015740 A1 | 10/2001 | |
| DE | 60215591 T2 | 8/2007 | |
| DE | 102008041561 A1 | 3/2010 | |
| DE | 102009029231 A1 | 3/2011 | |
| DE | 102010001612 A1 | 8/2011 | |
| DE | 102010016231 A1 | 8/2011 | |
| DE | 102013224404 A1 | 5/2015 | |
| EP | 0778411 A2 | 6/1997 | |
| EP | 0959243 A1 | 11/1999 | |
| EP | 1296055 A2 | 3/2003 | |
| EP | 2206912 A2 * | 7/2010 | ........... F02M 47/027 |

OTHER PUBLICATIONS

Machine Translation of EP 2206912 A2 PDF File Name: "EP2206912A2_Machine_Translation.pdf".*

* cited by examiner

THROTTLE DEVICE FOR CONTROLLING AN AMOUNT OF FUEL TO BE SUPPLIED TO A FUEL INJECTION NOZZLE, AS WELL AS AN INJECTION DEVICE

BACKGROUND OF THE INVENTION

Field of the Invention

The invention relates to a throttle device by means of which predetermined fuel quantities can be supplied to a fuel injection nozzle. The invention also relates to an injection device which has a throttle device of said type.

Throttle devices and injection devices of said type are known from the prior art.

For example, FIG. 4 and FIG. 5 present such a known injection device having a throttle device arranged therein.

An injection device 10 shown in FIGS. 4 and 5 is provided for injecting fuel 12, which has beforehand been highly pressurized, into a combustion chamber (not shown). The injection device 10 has, for this purpose, a fuel injection nozzle 14 to which the pressurized fuel 12 is supplied via a throttle device 16.

The regions circled in FIG. 4 and FIG. 5 show the throttle device 16 in greater detail. The throttle device 16 has a supply device 18 by way of which the pressurized fuel 12 can be supplied to a control chamber 20. Furthermore, a discharge device 22 branches off from the control chamber 20, via which discharge device fuel 12 can flow out from the control chamber 20 again.

In the discharge device 22 there is arranged a valve 24 by way of which the discharge device 22 can be closed. FIG. 4 shows the valve 24 in a closed state, and FIG. 5 shows the valve in an open state. The valve 24 is actuated by way of an actuator device 26 which is arranged in a connector element 28 which forms a termination of a housing 30 in which the fuel injection nozzle 14 and the throttle device 16 are arranged.

The actuator device 26 commonly has a piezo stack 32, the stroke of which can be used for actuating the valve 24. When the Piezo stack 32 is in a rest position, shown in FIG. 4, that is to say the piezoelectric elements in the piezo stack 32 have not been expanded, the valve 24 is closed. As a result, the control chamber 20 is charged with very high pressure, and, by way of said pressure, closes a valve needle 34 which is arranged at the fuel injection nozzle 14. As a result, injection openings 36 are closed, and no fuel 12 enters the combustion chamber from the injection device 10.

In FIG. 5, the piezo stack 32, by way of its stroke, actuates the valve 24, such that the latter opens and fuel 12 can flow out of the discharge device 22. The control chamber 20 is thus relieved of pressure, and the valve needle 34 opened. Fuel 12 can thus enter the combustion chamber from the injection openings 36.

FIG. 4 and FIG. 5 show known constructions of an injection device 10 in the case of which the actuator device 26 is arranged as a separate component outside the housing 30.

In the case of relatively new developments, it is sought to arrange the actuator device, in particular the piezo stack, in the interior of the housing of the injection device. During operation, the piezo stack heats up, and dissipates the thus generated working heat to the housing and to the components of the injection device arranged in the surroundings. Since fuel which is conducted to the fuel injection nozzle flows past in said region, the working heat is automatically released to the fuel. The working heat is thus transported onward by the fuel in the direction of the fuel injection nozzle. Owing to this thermal effect, the problem arises that the injection device opens to an ever lesser degree, and thus successively less fuel is injected into the combustion chamber.

SUMMARY OF THE INVENTION

It is therefore an object of the invention to propose an arrangement by way of which the fuel injection quantity can be kept substantially constant despite heating of the fuel.

Said object is achieved by way of a throttle device having the features described below.

An injection device which has the throttle device is the subject of the coordinate claim.

Advantageous embodiments of the invention are the subject of the dependent claims.

A throttle device for controlling a fuel quantity to be supplied to a fuel injection nozzle has a control chamber for collecting the fuel and a supply device for supplying the fuel to the control chamber in a main flow direction. The supply device has an inlet throttle for reducing a pressure of the fuel in the main flow direction, wherein the inlet throttle has a length $L_Z$. The length $L_Z$ of the inlet throttle is selected such that a fuel flowing through the inlet throttle during operation flows through the inlet throttle in a turbulent flow.

The inlet throttle is provided for advantageously reducing a pressure of the fuel in the flow direction. For example, a pressure of between 1800 bar and 2200 bar prevails upstream of the inlet throttle, and a pressure of between 1200 bar and 1600 bar prevails downstream of the inlet throttle.

In tests, it has been found that, during the operation of an injection device and thus during the generation of working heat, the region around the throttle device is heated up to an ever greater degree. The fuel flowing past absorbs said working heat and conducts it onward in the direction of the fuel injection nozzle.

Furthermore, it has been determined by way of tests that the pressure in the control chamber rises over the operating time, without a pressure dissipation occurring in the control chamber. The pressure acts on a top side of the injection needle. Since the pressure is no longer dissipated as desired, the pressure acts permanently on the injection needle, the injection needle can no longer be adequately accelerated, and the fuel injection nozzle can no longer open in the desired manner. As a result of the increase of the temperature of the fuel, it is correspondingly the case that a normal, desired pressure dissipation in the control chamber is no longer possible. To permit a desired pressure dissipation in the control chamber again, the supply device is, in the region of the inlet throttle, designed such that a turbulent flow of the fuel is realized in the inlet throttle. The mass flow of fuel flowing into the control chamber is dependent on a throughflow coefficient of the inlet throttle. In laminar flows, owing to friction effects, the throughflow coefficient itself is dependent on the prevailing temperature. Therefore, in laminar flows, the throughflow coefficient, and thus also the mass flow conducted through the inlet throttle, increase with increasing temperature.

However, if the inlet throttle is now designed such that a turbulent flow is generated therein, this yields a throughflow coefficient which is substantially constant over large temperature ranges, because the throughflow coefficient in the case of turbulent flows, by contrast to the throughflow coefficient in laminar flows, is not temperature-dependent.

A turbulent flow in the inlet throttle can be achieved by virtue of the length $L_z$ of said inlet throttle being selected to be particularly short. The shorter the inlet throttle, the greater the Reynolds number. If the Reynolds number exceeds a critical point, the flow profile changes from laminar to turbulent. Therefore, when the critical Reynolds number is exceeded, the throughflow coefficient becomes independent of temperature, and the mass flow into the control chamber can be kept constant. In this way, a pressure increase in the control chamber as a result of an undesired change in mass flow can be avoided.

As a result, the desired pressure dissipation in the control chamber is made possible again, and the performance of the fuel injection nozzle can be kept substantially constant over the operating time.

To advantageously achieve the described effects, the length $L_z$ of the inlet throttle preferably lies in a length range of 0.1 mm to 0.5 mm. Here, in particular, a range of 0.15 mm to 0.4 mm, more particularly a range of 0.2 mm to 0.3 mm, is preferable.

It is preferably the case that a diameter $D_z$ of the inlet throttle is selected to be smaller the smaller the length $L_z$ of the inlet throttle is selected to be. By changing the length $L_z$ of the inlet throttle, the mass flow supplied through the inlet throttle into the control chamber also changes slightly; the mass flow becomes greater. To advantageously counteract this effect, with the shortening of the length $L_z$, the diameter $D_z$ of the inlet throttle is simultaneously reduced, such that the mass flow is preferably also reduced.

For example, in the case of a length range of the inlet throttle of 0.4 mm to 0.5 mm, a diameter $D_z$ is selected which lies in a range from 171 µm to 176 µm. In an alternative example, in the case of a length $L_z$ of 0.2 mm to 0.3 mm, a diameter $D_z$ in the range from 166 µm to 170 µm is selected.

A discharge device for discharging the fuel from the control chamber is preferably provided, wherein the discharge device is arranged at the control chamber such that the fuel is discharged from the control chamber in a discharge flow direction which is opposite to the main flow direction of the fuel in the supply device.

The discharge device preferably has an outlet throttle for reducing a pressure of the fuel in the discharge flow direction, wherein the discharge device furthermore has an outflow region upstream of the outlet throttle in the discharge flow direction, wherein a longitudinal axis of the outlet throttle is preferably arranged so as to be inclined relative to an axis of the discharge flow direction in the outflow region.

Analogously to the inlet throttle, the outlet throttle is provided for advantageously reducing the fuel pressure in the flow direction. For example, a pressure of between 1200 bar and 1600 bar acts upstream of the outlet throttle, and a pressure of between 40 bar and 80 bar acts downstream of the outlet throttle.

In the case of rectilinearly arranged outlet throttles, it is normally the case that a gas cushion composed of fuel vapors forms in the wall region of the outlet throttle. As a result, friction forces between outflowing fuel and the wall region of the outlet throttle are avoided. A situation in which the fuel entering the outlet throttle in turbulent form could assume a laminar form is thus also substantially avoided. This however also simultaneously avoids a situation in which, in the case of increasing temperature of the outlet throttle, a greater mass flow could also emerge from the control chamber through the outlet throttle. If the outlet throttle is now advantageously arranged in inclined fashion, the gas cushion composed of fuel vapors travels along one wall region, such that, at an oppositely situated wall region, advantageous friction arises between the fuel and the wall region. This preferably leads to a laminar flow in said region. Thus, in said region, in the case of an increasing temperature, an increase of the throughflowing mass flow can also be achieved. This advantageously contributes to a situation in which, in the event of a temperature increase of the throttle device, the pressure in the control chamber can altogether be kept preferably constant.

To advantageously realize a compromise between optimum utilization of the available structural space and the desired abovementioned effects, an angle of inclination between the longitudinal axis and the axis of the discharge flow direction of the fuel in the outflow region is preferably selected to be preferably less than 50°, in particular less than 45°.

The inlet throttle is preferably a non-cavitating throttle. The outlet throttle is particularly preferably a cavitating throttle. This means that a gas cushion composed of fuel forms at least in a subregion of the wall region of the outlet throttle.

An injection device for injecting fuel into a combustion chamber has a fuel injection nozzle for injecting the fuel into the combustion chamber and has an above-described throttle device for controlling a fuel quantity to be supplied to the fuel injection nozzle during operation.

The injection device preferably has a housing with an upper region and a lower region, wherein the fuel injection nozzle and the throttle device are arranged in the lower region, wherein furthermore, an actuator device for actuating a valve of the discharge device is provided, wherein the actuator device has a piezo stack which is arranged together with the throttle device and the fuel injection nozzle in the lower region of the housing in the direct vicinity of the throttle device, such that, during operation, waste heat from the piezo stack is introduced into the throttle device.

Owing to the preferred arrangement of the piezo stack within the housing and thus in the direct vicinity of the throttle device, it is advantageously possible for structural space to be saved. If, by way of this advantageous arrangement, working heat is now introduced from the piezo stack into the throttle device, it is particularly advantageous if the throttle device is designed as described above, such that the pressure in the control chamber can be dissipated despite the temperature increase, and thus a desired acceleration of the injection needle becomes possible.

BRIEF DESCRIPTION OF THE SEVERAL VIEWS OF THE DRAWING

Advantageous embodiments of the invention will be discussed in more detail below on the basis of the appended drawing, in which.

DESCRIPTION OF THE INVENTION

Figure 1:
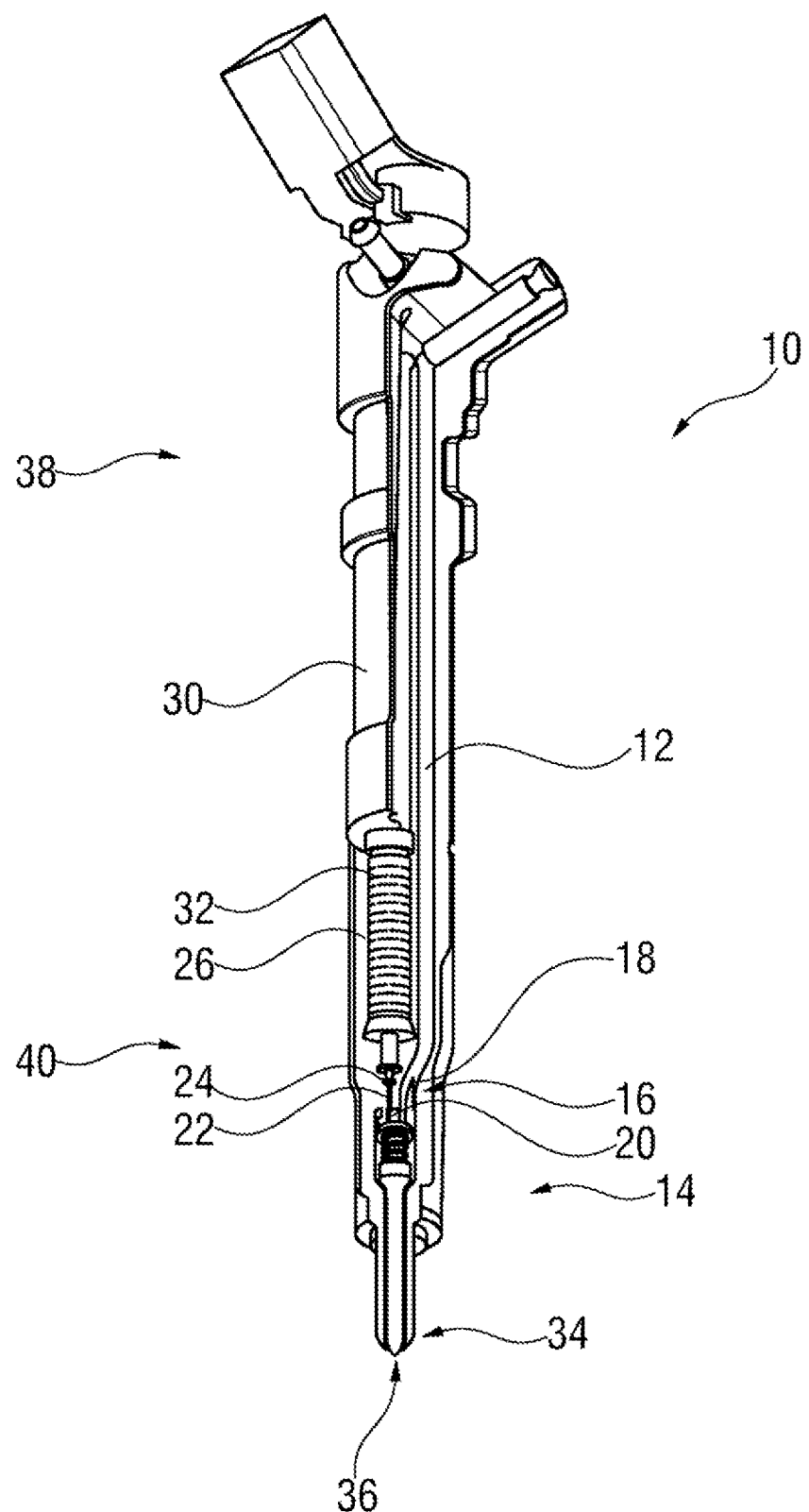
FIG. 1 shows an injection device for injecting fuel into a combustion chamber.

FIG. 1 shows an injection device 10 by way of which fuel 12 can be injected into a combustion chamber (not shown).

The injection device 10 has a fuel injection nozzle 14 with a valve needle 34, a throttle device 16 with a supply device 18 and with a discharge device 22, and an actuator device 26 with a piezo stack 32. All of said elements of the injection device 10 are arranged in a housing 30, wherein the housing 30 has an upper region 38 and a lower region 40. Here, the actuator device 26, the throttle device 16 and the fuel injection nozzle 14 are arranged together in the lower region 40. Here, the actuator device 26 with the piezo stack 32 is situated in the immediate vicinity of the throttle device 16, such that working heat from the piezo stack 32 can be introduced directly into the throttle device 16.

To be able to counteract negative effects of said introduction of heat, the throttle device 16 is formed with a special geometry.

Figure 2:
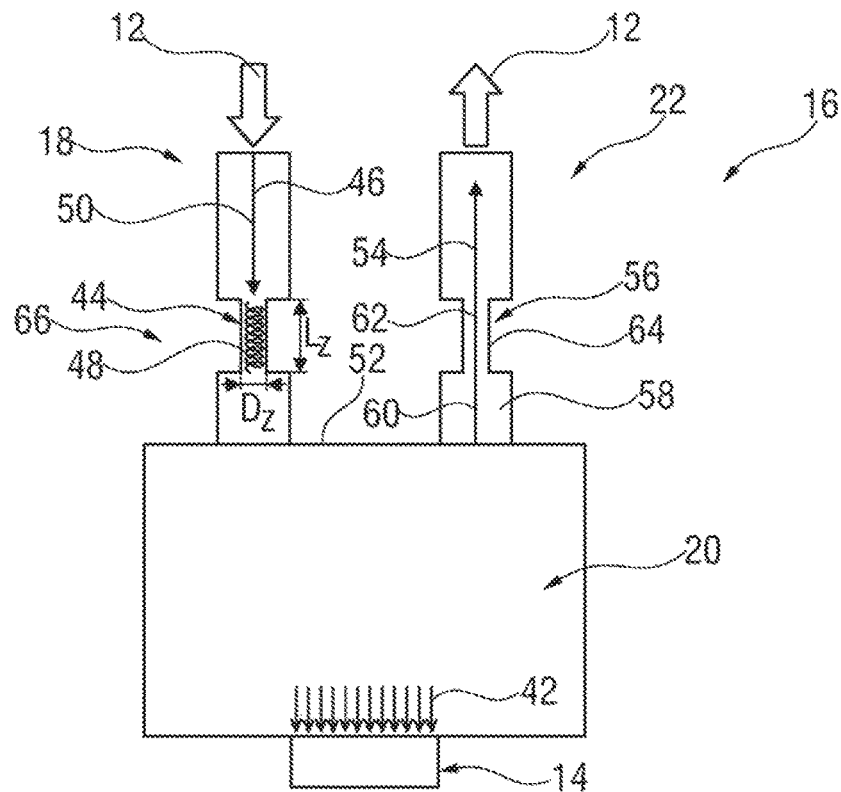
FIG. 2 shows a throttle device which is arranged in the injection device in FIG. 1 and which has an inlet throttle and an outlet throttle.

FIG. 2 shows a detailed view of the throttle device 16. The throttle device 16 has a control chamber 20 in which pressurized fuel 12 is stored in order, by way of said pressure, to hold the fuel injection nozzle 14 closed along a force direction 42. The fuel 12 is supplied to the control chamber 20 via a supply device 18 and is discharged from the control chamber 20 via a discharge device 22. The pressure prevailing in the control chamber 20 should, where possible, remain constant in a desired range.

The supply device 18 has an inlet throttle 44. The fuel 12 flows through the supply device 18 and thus also through the inlet throttle 44 in a main flow direction 46 into the control chamber 20. Via the inlet throttle 44, the pressure in the fuel 12 is lowered from for example 2000 bar to for example approximately 1800 bar. A length $L_Z$ of the inlet throttle 14 is selected such that as high a Reynolds number as possible is obtained and thus a turbulent flow 48 can be realized. In a turbulent flow 48, the throughflow coefficient, which directly influences the mass flow of the fuel 12, is independent of temperature, such that an increased supply of fuel 12 into the control chamber 20 as a result of a temperature increase—for example as a result of a discharge of working heat from the adjacent piezo stack 32—can be avoided. For example, the inlet throttle 44 has a length $L_Z$ in a length range from 0.1 mm to 0.5 mm.

In the case of a short length $L_Z$, the mass flow of the fuel 12 increases slightly, such that it is advantageous for a diameter $D_Z$ of the inlet throttle 44 to also be adapted.

For example, if the length $L_Z$ lies in a range from 0.4 mm to 0.5 mm, a diameter $D_Z$ in a range from 171 µm to 176 µm is expedient. In a further example, the length $L_Z$ may also lie in a range from 0.2 mm to 0.3 mm, wherein, in this case, a diameter $D_Z$ in a range from 161 µm to 170 µm is expedient.

As can also be seen in FIG. 2, at the control chamber 20, there is arranged a discharge device 22 through which fuel 12 can be discharged from the control chamber 20. The discharge device 22 is in this case arranged at the same face side 52 of the control chamber 20 as the supply device 18. In this way, the fuel 12 is discharged out of the control chamber 20 in a discharge flow direction 54 which is opposite to the main flow direction 76.

The discharge device 22 also has a throttle in the form of an outlet throttle 56. By way of said throttle, the pressure in the fuel 12 can be reduced along the discharge flow direction 54, for example from approximately 1600 bar upstream of the outlet throttle 56 to approximately 80 bar downstream of the outlet throttle 56.

Adjacent to the outlet throttle 56, the discharge device 22 has, arranged at the control chamber 20, an outflow region 58 which the fuel 12 flowing out of the control chamber 20 firstly enters before reaching the outlet throttle 56.

The pressure in the control chamber 20 is defined by the throttle ratio of the inlet throttle 44 and outlet throttle 56, and is thus directly dependent on the respective throughflow coefficients of the two throttles 44, 56. The throughflow coefficients are now influenced in order to prevent the pressure in the control chamber 20 from building up to such an extent that the fuel injection nozzle 14 can no longer open correctly.

Figure 3:
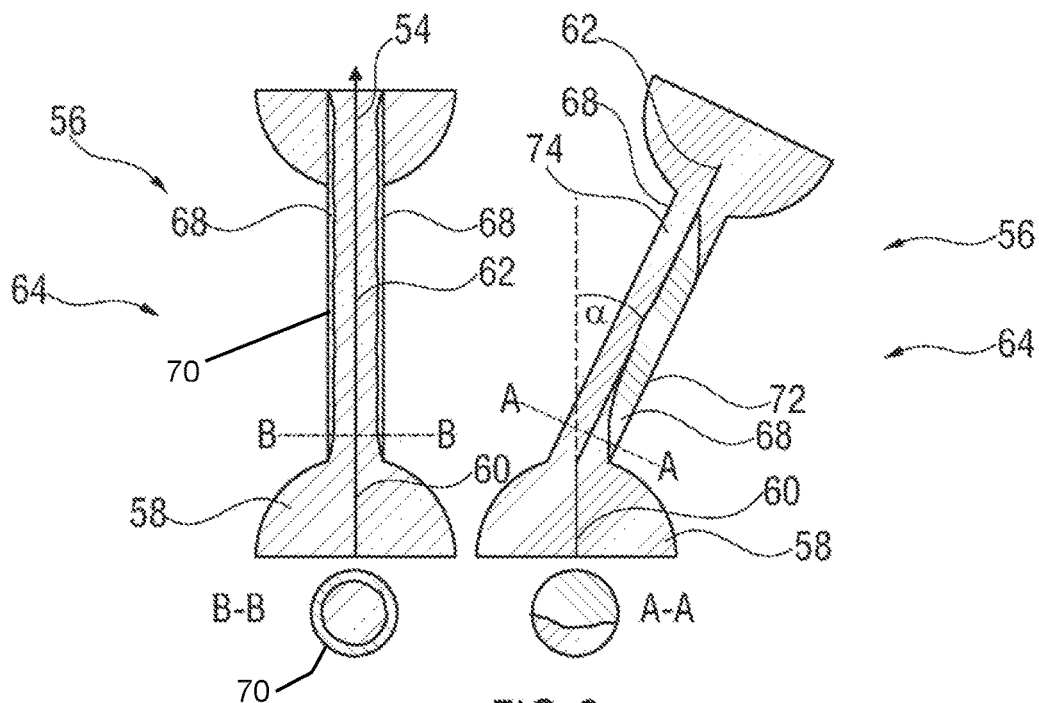
FIG. 3 shows the outlet throttle from FIG. 2 in a non-inclined state and in an inclined state.
Figures 4, 5:
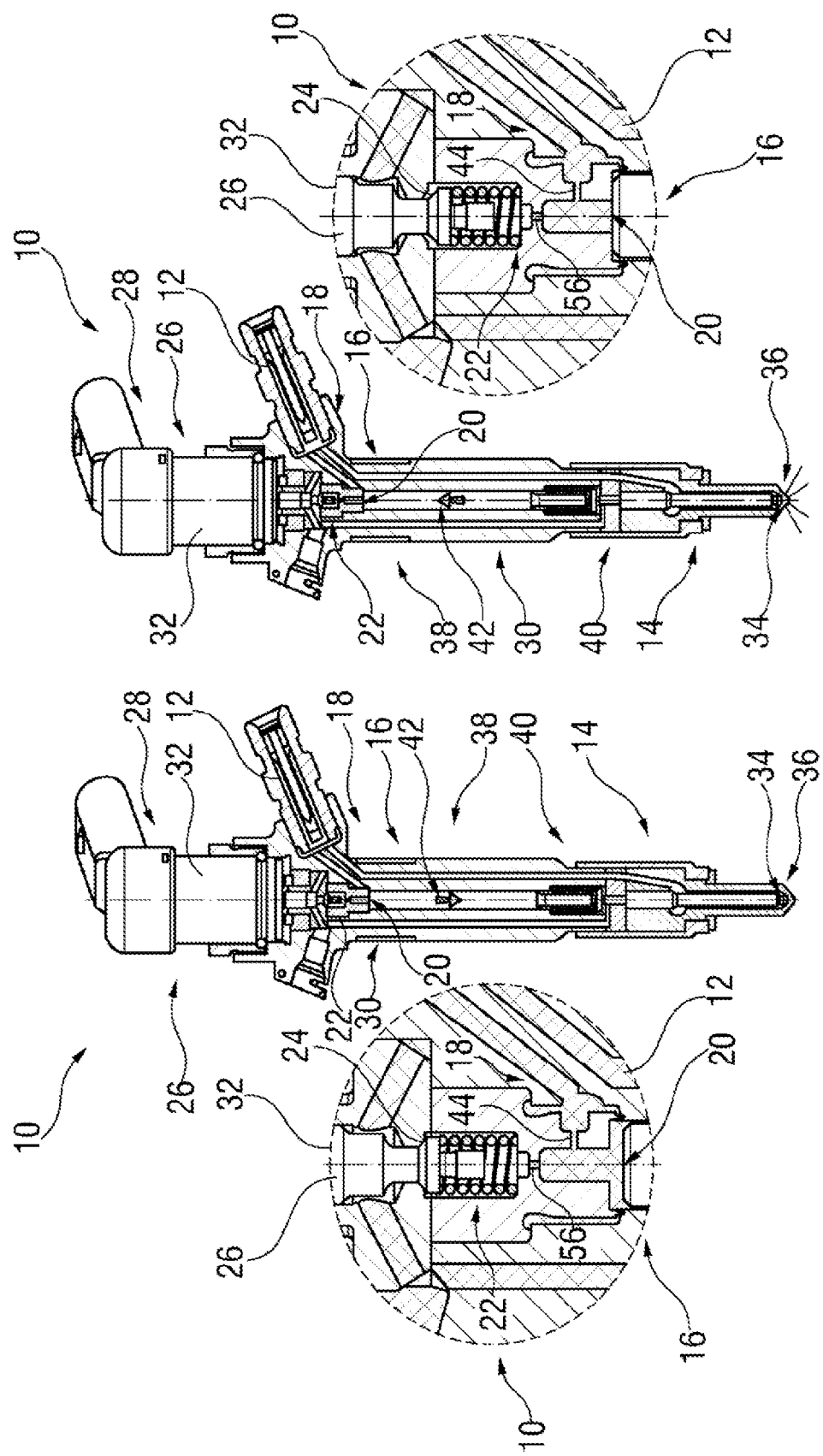
FIG. 4 shows an injection device according to the PriorArt.
FIG. 5 shows an injection device according to the Prior Art.

It can be seen in FIG. 3 that the outlet throttle 56 may exist in two alternative embodiments.

Here, the left-hand illustration shows an outlet throttle 56 which is arranged rectilinearly along the discharge flow direction 54. This means that a longitudinal axis 12 of the outlet throttle 56 runs coaxially with respect to an axis 60 of the discharge flow direction 54 in the outflow region 58.

However, in an alternative exemplary embodiment, the outlet throttle 56 is arranged at the outflow region 58 in inclined fashion, that is to say the longitudinal axis 62 runs so as to be inclined with respect to the axis 60 of the discharge flow direction 54 in the outflow region 58. Here, an angle of inclination α is advantageously less than 50° and more advantageously less than 45°. In this way, despite the preferred inclination of the outlet throttle 56, it is furthermore the case that a small structural space may be adequate for the arrangement of the throttle device 16.

The effect of the inclination of the outlet throttle 56 is illustrated in FIG. 3.

The outlet throttle 56 is operated as a cavitating throttle 64, by contrast to the inlet throttle 44, which is operated as a non-cavitating throttle 60. Here, "cavitating" means that a gas cushion 70 forms at a wall region 68 of the outlet throttle 56. In a non-inclined outlet throttle 56, shown in the left-hand image in FIG. 3, cross-sectional view B-B, the gas cushion 70 is situated in encircling fashion over the entire wall region 68 of the outlet throttle 56.

The encircling gas cushion 70 prevents friction effects between the fuel 12 and the wall region 68 of the outlet throttle 56. In this way, the viscosity dependency of the mass flow is reduced or eliminated entirely.

and the mass flow which flows out of the outlet throttle 56 remains constant even in the event of a temperature increase.

Now, if the outlet throttle 56 is arranged in inclined fashion, as shown in the cross-sectional view A-A in the right-hand image of FIG. 3, the gas cushion 70 moves to a first subregion 72 of the wall region 68, whereas a second subregion 74 of the wall region 68 is now in direct contact with the fuel 12. In this way, friction effects arise in the outlet throttle 56, and in said region, the mass flow through the outlet throttle 56 is now temperature-dependent. This means that, in the presence of elevated temperature, a greater fuel quantity will also emerge from the outlet throttle 56.

Altogether, simply through the provision of a predefined length $L_Z$ of the inlet throttle 44, a mass flow difference in an upward direction which is undesired in the event of a temperature increase can be avoided, such that, even in the case of a constant mass flow flowing out at the outlet throttle 56, an undesired pressure increase in the control chamber 20 can be prevented.

Said effect can additionally be assisted if the outlet throttle 56 is arranged in inclined fashion and, in said region, the previously temperature-independent mass flow then becomes at least partially temperature-dependent, and thus more fuel 12 flows out of the outlet throttle 56 in the presence of elevated temperature than at low temperatures.

Both geometrical measures—short inlet throttle 44 and inclined outlet throttle 56—therefore contribute individually, but also in combination, to keeping the pressure in the control chamber 20 substantially constant even in the event of a temperature increase, in order to thereby make it possible for the fuel injection nozzle 14 to continue to open as desired.

Altogether, the throttle ratio of inlet throttle 44 and outlet throttle 56 remains constant over large temperature ranges, such that the pressure in the control chamber can be kept constant.

LIST OF REFERENCE DESIGNATIONS

10 Injection device
12 Fuel
14 Fuel injection nozzle
16 Throttle device
18 Supply device
20 Control chamber
22 Discharge device
24 Valve
26 Actuator device
28 Connector element
30 Housing
32 Piezo stack
34 Valve needle
36 Injection opening
38 Upper region
40 Lower region
42 Force direction
44 Inlet throttle
46 Main flow direction
48 Turbulent flow
50 Laminar flow
52 Face side
54 Discharge flow direction
56 Outlet throttle
58 Outflow region
60 Axis of discharge flow direction in outflow region
62 Longitudinal axis
64 Cavitating throttle
66 Non-cavitating throttle
68 Wall region
70 Gas cushion
72 First subregion
74 Second subregion
$L_Z$ Length of inlet throttle
$D_Z$ Diameter of inlet throttle
$\alpha$ Angle of inclination

The invention claimed is:

1. A throttle device for controlling a fuel quantity to be supplied to a fuel injection nozzle, the throttle device comprising:
a control chamber for collecting the fuel; and
a supply device for supplying the fuel to said control chamber in a main flow direction;
said supply device having an inlet throttle for reducing a pressure of the fuel in said main flow direction, said inlet throttle having a length, and said length of said inlet throttle being selected to cause a fuel flowing through said inlet throttle during operation to flow through said inlet throttle in a turbulent flow, said length of said inlet throttle lying in a length range from 0.4 mm to 0.5 mm and said inlet throttle having a diameter lying in a diameter range from 171 µm to 176; and
a discharge device for discharging the fuel from said control chamber, said discharge device discharging the fuel from said control chamber in a discharge flow direction being opposite to said main flow direction of the fuel in said supply device.

2. The throttle device according to claim 1, wherein said length of said inlet throttle lies in a length range from 0.1 mm to 0.5 mm.

3. The throttle device according to claim 1, wherein said length of said inlet throttle lies in a length range from 0.15 mm to 0.4 mm.

4. The throttle device according to claim 1, wherein said length of said inlet throttle lies in a length range from 0.2 mm to 0.3 mm.

5. The throttle device according to claim 1, wherein said inlet throttle has a diameter being reduced proportionally to a reduction of said length of said inlet throttle.

6. The throttle device according to claim 1, wherein said inlet throttle is a non-cavitating throttle.

7. An injection device for injecting fuel into a combustion chamber, the injection device comprising:
a fuel injection nozzle for injecting the fuel into the combustion chamber; and
a throttle device according to claim 1 for controlling a fuel quantity to be supplied to said fuel injection nozzle during operation.

8. The injection device according to claim 7, which further comprises:
a housing having an upper region and a lower region;
said fuel injection nozzle and said throttle device being disposed in said lower region;
a discharge device for discharging the fuel from said control chamber, said discharge device having a valve; and an actuator device for actuating said valve of said discharge device, said actuator device having a piezo stack disposed together with said throttle device and said fuel injection nozzle in said lower region of said housing in a direct vicinity of said throttle device, for introducing waste heat from said piezo stack into said throttle device during operation.

9. A throttle device for controlling a fuel quantity to be supplied to a fuel injection nozzle, the throttle device comprising:
a control chamber for collecting the fuel; and
a supply device for supplying the fuel to said control chamber in a main flow direction;
said supply device having an inlet throttle for reducing a pressure of the fuel in said main flow direction, said inlet throttle having a length, and said length of said inlet throttle being selected to cause a fuel flowing through said inlet throttle during operation to flow through said inlet throttle in a turbulent flow said length of said inlet throttle lying in a length range from 0.2 mm to 0.3 mm and said inlet throttle having a diameter lying in a diameter range from 166 µm to 170 µm ; and
a discharge device for discharging the fuel from said control chamber, said discharge device discharging the fuel from said control chamber in a discharge flow direction being opposite to said main flow direction of the fuel in said supply device.

10. The throttle device for controlling a fuel quantity to be supplied to a fuel injection nozzle, the throttle device comprising:
a control chamber for collecting the fuel; and
a supply device for supplying the fuel to said control chamber in a main flow direction;
said supply device having an inlet throttle for reducing a pressure of the fuel in said main flow direction, said inlet throttle having a length, and said length of said inlet throttle being selected to cause a fuel flowing through said inlet throttle during operation to flow through said inlet throttle in a turbulent flow;

a discharge device for discharging the fuel from said control chamber, said discharge device discharging the fuel from said control chamber in a discharge flow direction being opposite to said main flow direction of the fuel in said supply device;

said discharge device has an outlet throttle for reducing a pressure of the fuel in said discharge flow direction;

said discharge device has an outflow region disposed upstream of said outlet throttle in said discharge flow direction;

said discharge flow direction has an axis in said outflow region; and said outlet throttle has a longitudinal axis being inclined relative to said axis of said discharge flow direction in said outflow region.

11. The throttle device according to claim 10, wherein said longitudinal axis and said axis of said discharge flow direction of the fuel in said outflow region define an angle of inclination there between being less than 50°.

12. The throttle device according to claim 10, wherein said longitudinal axis and said axis of said discharge flow direction of the fuel in said outflow region define an angle of inclination there between being less than 45°.

13. The throttle device according to claim 10, wherein said outlet throttle is a cavitating throttle.

14. The throttle device according to claim 10, wherein said inlet throttle is a non-cavitating throttle and said outlet throttle is a cavitating throttle.

\* \* \* \* \*